No. 876,130. PATENTED JAN. 7, 1908.
F. BARBER.
BUTTER CUTTER.
APPLICATION FILED MAY 13, 1907.
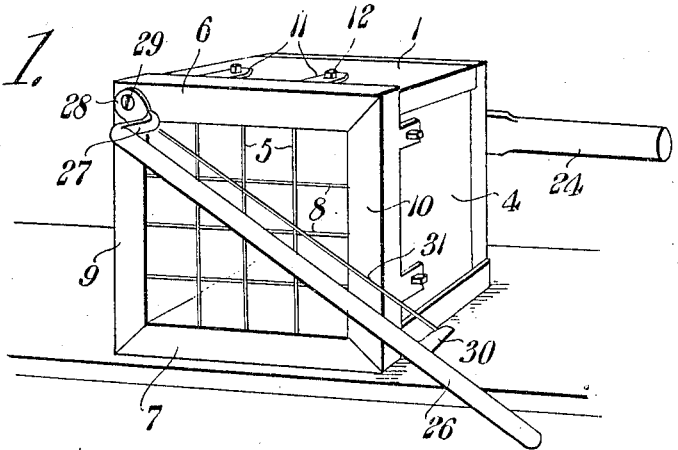
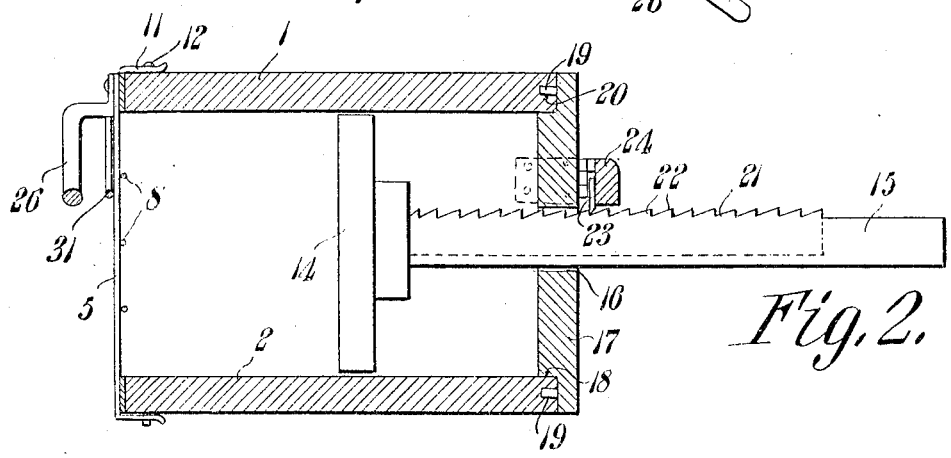
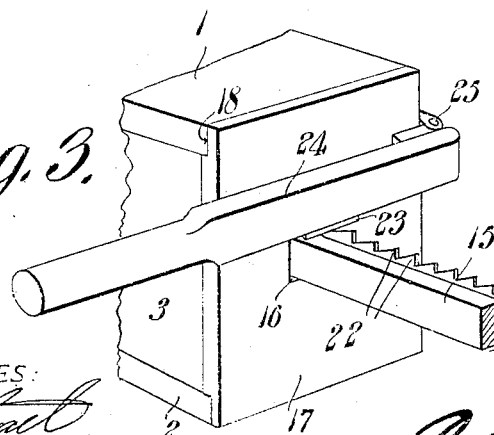
Frank Barber,
INVENTOR.
WITNESSES:
By C. A. Snow & Co.
ATTORNEYS

UNITED STATES PATENT OFFICE.

FRANK BARBER, OF GRAND RAPIDS, MICHIGAN.

BUTTER-CUTTER.

No. 876,130.　　　　Specification of Letters Patent.　　　　Patented Jan. 7, 1908.

Application filed May 13, 1907. Serial No. 373,415.

*To all whom it may concern:*

Be it known that I, FRANK BARBER, a citizen of the United States, residing at Grand Rapids, in the county of Kent and State of Michigan, have invented a new and useful Butter-Cutter, of which the following is a specification.

This invention relates to improvements in devices for cutting butter and similar substances into a number of small pieces, and it has for its object to provide a device of this character that is capable of readily dividing a mass of butter into a number of individual blocks of uniform size, the device being so constructed that it may be easily operated, quickly filled with butter and readily cleaned, the construction of the device being so simple that it may be manufactured and sold at a comparatively small price.

To these and other ends, the invention comprises the various novel features of construction and combination and arrangement of parts, which will be more fully hereinafter described, and pointed out particularly in the claims appended hereto.

In the accompanying drawing:—Figure 1 is a perspective view of a butter cutter constructed in accordance with the present invention. Fig. 2 is a longitudinal section of the device shown in Fig. 1. Fig. 3 is a perspective view of the device as viewed from the rear.

Corresponding parts in the several figures are indicated throughout by similar characters of reference.

Butter cutters constructed in accordance with my present invention are especially adapted for use in hotels, lunch rooms, and other places where it is desirable to provide individual portions of butter for table use, and the device shown in the present embodiment of the invention comprises a receptacle made up in the present instance of a top and bottom 1 and 2, respectively, and sides 3 and 4, these parts being composed of wood, or other appropriate material, and they may be of any desired dimensions, it being advantageous in many cases to construct it of a size sufficient to accommodate the entire head of butter as it is dumped from the tub, as this minimizes the amount of handling required, or, if preferred, the butter may be suitably packed into the receptacle. One end of the receptacle is provided with a set of suitably spaced dividing wires, these wires, in the present instance, being spaced equi-distantly and arranged in sets crossing one another at right angles, the wires 5 extending vertically and having their upper and lower ends soldered or otherwise fixed to the horizontal cross pieces 6 and 7 of a supporting frame, and the wires 8 extending horizontally and having their ends suitably attached to the vertical portions 9 and 10 of the frame, the arrangement of the wires in this particular instance causing the butter to be cut into blocks of rectangular shape, but it will be understood, of course, any desired arrangement of the wires may be employed in order that blocks having the desired outlines may be obtained.

The frame to which the dividing wires are attached is preferably removable relatively to the receptacle in order to permit it to be relatively cleansed, and for this purpose it is provided with a set of lugs 11 overlapping the forward edge of the receptacle and adapted to coöperate with pins or buttons 12 thereon, these lugs being sufficiently flexible or resilient to enable them to be swung over the respective projections.

A plunger 14 is mounted to operate longitudinally of the receptacle and it is provided with a guiding and operating stem 15, the latter operating through an axially arranged aperture 16 formed in the back 17, the latter being preferably fitted removably into the rear of the receptacle and it is centered relatively to the latter by means of a shoulder 18 thereon engaging the inside of the receptacle, and the dowel pins 19 coöperating with the apertures 10 in the receptacle.

In order to insure uniform thickness of all the blocks, it is preferable to employ feeding devices for the plunger that will advance it a uniform distance prior to each cutting operation, the feeding devices in the present instance embodying a ratchet bar 21 secured to and movable with the stem 15 of the plunger, and coöperating with the teeth 22 on this bar is a plate 23 carried by an operating lever 24, the latter being pivoted to a relatively fixed part of the receptacle by means of a hinge or pivot 25 of any suitable construction, the axis of the hinge or pivot permitting a relative swinging movement of the lever in a plane coincident with the teeth of the ratchet bar, sufficient lateral play being permitted the lever to enable it to ratchet over the teeth. The teeth on the ratchet bar are preferably spaced distances equivalent to the thickness it is desired to give the blocks of butter, so that at each operation of the lever the mass of butter will be advanced a uniform distance. The mass of butter may be applied to the receptacle from either end but preferably from the rear, as the back can be very easily removed, and by engaging the lever successively with the teeth of the ratchet bar, the plunger will be moved forward step by step, causing the mass of butter to be extended beyond the plane of the dividing wires arranged in front of the receptacle.

Any suitable knife may be employed for cutting off the protruding portions of the butter to form the individual blocks or pieces, the knife shown in the present instance embodying a lever 26 having a laterally turned arm 27 thereon provided with an ear 28 adapted to receive the pivot screw 29, the latter being located on the face of the wire supporting frame, preferably at one of its upper corners, the pivot insuring a movement of the lever in a plane parallel to the plane occupied by the dividing wires. Toward the free end of the lever is provided a laterally turned arm 30, and stretched tightly between the arms 27 and 30 is a cutting blade 31, that shown being composed of a wire of sufficient gage and strength and it is stretched between the arms of the lever with a tension sufficient to retain it in coöperative relation with the dividing wires, the swinging movement of the lever carrying the blade over the surface of the dividing wires and thereby cutting off the butter protruding through the interstices of the crossed wires, the knife being operated once after each free movement of the lever 24, a single operation of the knife serving to sever a number of blocks equal to the number of interstices of the crossed wires.

A butter cutter constructed in accordance with my present invention may be made and sold at a relatively small price, and it is capable of dividing the mass of butter into a number of individual pieces of uniform dimensions, the feeding device insuring uniform thickness of all the pieces, while the operating parts are conveniently located so that one part may be operated by each hand. Moreover, the device is so constructed as to enable it to be readily taken apart, facilitating cleaning thereof so that it may be kept in a sanitary condition.

It will be noted that the supporting frame carrying the wires 5 and 8 can be readily placed in position on the receptacle simply by springing the lugs 11 into engagement with the retaining pins 12 and it can be as readily detached by reversing this operation. It will also be seen that the knife is mounted upon this frame and removable therewith. By constructing and arranging the frame in the manner stated it becomes possible to readily remove or replace the frame whenever so desired and another frame having the wires 5 and 8 spaced apart greater or less distances than those of the removed frame can be substituted.

What is claimed is:—

In a butter cutter the combination with a receptacle having an open end, dividing wires extending across said end, and means movably mounted upon said end for severing material divided by the wires; of a plunger within the receptacle, a stem projecting therefrom and beyond the receptacle, said stem having ratchet teeth, a horizontally oscillatory lever connected to the receptacle, and a plate carried by the lever and disposed when moved in one direction to pass over the teeth and when moved in the opposite direction to engage a tooth and direct the plunger toward the open end of the receptacle.

In testimony that I claim the foregoing as my own, I have hereto affixed my signature in the presence of two witnesses.

FRANK BARBER.

Witnesses:
 MARVIN A. SMITH,
 HOWARD CR. BECK.